United States Patent [19]

Mandt

[11] 4,019,983

[45] Apr. 26, 1977

[54] DISINFECTION SYSTEM AND METHOD

[75] Inventor: Mikkel G. Mandt, Prophetstown, Ill.

[73] Assignee: Houdaille Industries, Inc., Buffalo, N.Y.

[22] Filed: Apr. 7, 1975

[21] Appl. No.: 565,872

Related U.S. Application Data

[63] Continuation-in-part of Ser. No. 513,724, Oct. 10, 1974, abandoned.

[52] U.S. Cl. .............................. 210/62; 210/63 Z; 210/220; 261/76; 261/DIG. 75
[51] Int. Cl.[2] ...................... C02B 1/36; B01F 3/04
[58] Field of Search ................ 210/198 R, 199, 14, 210/63, 62, 64, 220; 261/76, 77, DIG. 75; 259/4

[56] References Cited

UNITED STATES PATENTS

| 2,606,150 | 8/1952 | Thorp | 210/199 |
| 3,671,022 | 6/1972 | Laird et al. | 261/DIG. 75 |
| 3,833,719 | 9/1974 | Kuerten et al. | 261/DIG. 75 |

Primary Examiner—Thomas G. Wyse
Assistant Examiner—Benoit Castel
Attorney, Agent, or Firm—Fitch, Even, Tabin & Luedeka

[57] ABSTRACT

A rapid and efficient method for disinfection of waste liquid such as sewage effluent by means of a fluid disinfecting agent, (e.g. ozone or chlorine) in which the disinfecting agent and all of the waste liquid to be treated pass through a turbulent flow zone within a limited period of time. Also disclosed is specific apparatus for carrying out the method.

9 Claims, 12 Drawing Figures

Total Coliform Removal

Fig. 5

$f_2$ Virus Removal

Fig. 6

Total Coliform Profile
(17mg/l Chlorine Dose)

Fig. 7

$f_2$ Virus Profile
(17mg/l Chlorine Dose)

Fig. 8

Fig. 10 FECAL STREPTOCOCCI REMOVAL
At Prophetstown Chlorination Disinfection Plant

DISINFECTION SYSTEM AND METHOD

This application is a Continuation-In-Part of copending application Ser. No. 513,724, filed Oct. 10, 1974 and entitled "Method Of And Apparatus For Disinfection Of Waste Liquids" now abandoned.

The present invention relates generally to the field of waste treatment and more particularly to the field of disinfection of waste liquids such as sewage through the use of disinfecting agents such as ozone or chlorine.

For many years chlorine has been recognized as a good disinfectant and in one form or another has been involved in the majority of systems designed to produce germ-free water. In almost all modern sewage treatment plants, for example, chlorine is used to reduce the number of bacteria from the final effluent before it is discharged from the system, usually into a river or stream. A chlorination plant or system may also provide for removing color, correcting tastes, eliminating odor and suppressing other types of undesirable biological growths. Chlorine is also widely used in the treatment of industrial wastes and waters.

Substantial advances in the chemistry of water chlorination have been made in recent decades. This chemistry is known to be relatively complex, and various aspects of water chlorination chemistry may be reviewed in "Chemistry and Control of Modern Chlorination" by A. T. Palin (1973). In this connection, however, it is recognized that chlorine is a good disinfectant when applied to a waste liquid in the form of a solution of chlorine ($Cl_2$) gas in water. When the chlorine is added to water it rapidly hydrolyzes to form hydrochloric acid (HCl) and hypochlorous acid (HOCl), the latter partly dissociating to provide hydrogen ions and hypochlorite ions ($H^+OCl^-$). These three forms of available chlorine, namely, molecular chlorine ($Cl_2$), un-ionized hypochlorous acid (HOCl) and the hypochlorite ion ($OCL^-$), exist together in equilibrium, the relative proportions of each being determined by the pH value and temperature of the water. These forms of "free" chlorine react relatively rapidly with various types of waste water components including certain nitrogen and hydrocarbon compounds. The hypochlorite forms of "free" chlorine compounds are known to be generally more potent than the "combined" forms which are produced by reaction with compounds present in the waste water to be treated. Dissolved molecular $Cl_2$ is also believed to be a very potent disinfecting agent, but does not exist in appreciable quantity under equilibrium conditions at the pH of most waste water. The pH must be reduced to a relatively low value in order to enable molecular $Cl_2$ to exist in solution in substantial concentrations. Low pH treatment for large flows of waste water is, in general, prohibitively expensive, particularly if a subsequent neutralization treatment is also required.

Two of the most important design and operation parameters with respect to conventional large scale disinfection systems are the chlorine dosage or concentration, and the contact or retention time, which refers to the length of time during which the chlorine treated effluent is retained in a chlorine contact tank. Determination of the chlorine dosage or concentration involves balancing of various factors such as the increased kill rate or decreased contact time resulting from high chlorine dosage as opposed to higher disinfectant costs. The undesirability of the larger amounts of residual chlorine and various chlorination by-products resulting from treatment with higher dosages of chlorine is also an increasingly important factor to be considered. In this regard, residual chlorine and chlorination by-products such as chlorinated amines and hydrocarbons are proving to be less and less desirable in terms of environmental impact.

Taking into account such factors as initial cost, space requirements and retention time and chlorine dosage requirements, optimization of present chlorine contact tank design generally involves the provision of a serpentine multichannel path through which the effluent passes with an effluent retention time of from about 15 to about 30 minutes. The disinfection is accomplished by introducing an aqueous solution of chlorine at the inlet through which the effluent enters the chlorine contact tank.

It is understood as a result of relatively recent research that, with respect to the disinfection of effluent from a waste treatment system, initial or "flash" mixing of the effluent with HOCl and $OCl^-$ as the effluent enters a conventional chlorine contact tank increases the rate of kill of bacteria and virus in the effluent. "The Enhancement of Viral Inactivation by Halogens" by C. W. Kruse, V. P. Olivieri & K. Kawata, Water and Sewage Works, pp. 187–193 (June, 1971) and "Kinetics of Wastewater Chlorination in Continuous Flow Processes" by R. E. Selleck, H. F. Collins and G. white, presented at the 5th International Water Pollution Research Proceedings (July, August 1970) relate to such relatively recent research with respect to such initial or "flash" mixing. Perhaps the most recent and comprehensive investigation concerning the art of chlorination disinfection is reported in an article entitled "Improvement in Terminal Disinfection of Sewage Effluents" published in the June 1973 issue of Water & Sewage Works relating to work carried out at Sewage Treatment Plant No. 2, Fort Meade, Maryland, in 1972 by Messrs. C. W. Kruse, K. Kawata, V. P. Olivieri and K. E. Longley of the Department of Environmental Health, John Hopkins School of Hygiene and Public Health, Baltimore, Md. The thrust of the conclusions drawn by the authors of the foregoing article is that disinfection can be improved by improving sewage-aqueous chlorine mixing and by lowering the chlorine reaction pH.

The investigations which resulted in the present invention were also carried out in part at the Department of Environmental Health, John Hopkins School of Hygiene and Public Health and at Fort Meade Sewage Treatment Plant No. 2. The original area of inquiry involved effluent treatment with single nozzle ejector type mixers utilizing Venturi principles in which aqueous chlorine disinfectant was used as the motive fluid. This initial work, conducted over a 10 month period with both sewage and synthetic effluent preparations of bacteria and virus, did not produce substantial improvement over the results of the work reported by Kruse et al. However, it was determined during these initial investigations that substantial quantities of motive stream flow would be required to produce a desired mixing effect, and that the flow rate of aqueous chlorine solution necessary to produce this effect substantially exceeded the flow rate which could provide an acceptable chlorine dosage level. Furthermore, while a substantial amount of diluted disinfectant solution could be used, this would increase the demand for dilution water and correspondingly increase the final sewage flow. It was also determined that the use of a turbulent flow zone through which passes all of the effluent to be treated could enhance disinfection by providing greater and more thorough mixing of aqueous chlorine and effluent. Also during these investigations it was determined to study the direct introduction of gaseous chlorine and ozone, rather than aqueous chlorine solution, into a turbulent effleunt mixing zone. Subsequently, more complex ejector type mixing systems and methods were investigated. In this subsequent work, a portion of the waste liquid to be treated was employed as a motive liquid, and aqueous chlorine disinfectant was circumferentially introduced around the motive liquid jet. In terms of structure, two concentric nozzles discharged into a mixing chamber, the inner nozzle discharging a relatively high velocity jet of waste liquid effluent and the second or surrounding nozzle discharging a jet of aqueous chlorine.

This two-nozzle mixing system provided the capability for independently controlling the mixing effect and disinfectant solution quantity, and disinfection methods employing a turbulent mixing zone and direct introduction of gaseous chlorine or ozone into the effluent were also investigated. The methods and apparatus developed and refined in the course of this work were found to provide substantial advantages in waste water disinfection in terms of disinfection time, disinfectant dosage, and bacteria and virus kill for a given disinfectant dosage. Furthermore, the large expensive contact chamber of most of the presently existing chlorine disinfection systems can be reduced in size or eliminated, while the performance of existing chlorination disinfection contact chambers may be substantially upgraded without major modifications.

The present state of the art of chlorination disinfection is generally capable of producing favorable results in terms of germ "kill" and various other advantages which may be provided through the use of chlorine. Nevertheless, improvements in connection with various aspects of waste water disinfection such as the length of time and the costs involved in providing satisfactory disinfection, the completeness of disinfection, the amount of chlorine required to produce satisfactory disinfection and the quantities of residual chlorine and chlorination by-products which result from the chlorination process would be very desirable.

Accordingly, it is an object of the present invention to provide an improved method of and apparatus for disinfection of waste liquid such as the final effluent of a sewage treatment system.

Another object is the provision of methods and apparatus which are capable of providing short disinfection times, completeness of disinfection, low disinfectant dosage and low levels of residual chlorine and chlorination by-products.

These and other objects of the invention are more particularly set forth in the following detailed description and in the accompanying drawings of which

Generally the present invention is directed to methods and apparatus for rapidly and uniformly disinfecting aqueous waste liquids, such as partially treated sewage, through the use of a fluid disinfectant. Suitable disinfectants may be either gases or liquids and include chlorine gas, ozone, chlorine dioxide, and aqueous chlorine, bromine and iodine solutions. Aqueous chlorine solutions, chlorine gas and ozone are preferred disinfectants, and embodiments of the present invention which employ chlorine gas are particularly preferred.

Generally in accordance with the present invention, the disinfectant fluid and the effluent to be treated are continuously passed through an initial turbulent mixing zone where disinfectant concentration gradients are rapidly reduced within a limited period of time, and the turbulently mixed effluent is conducted from the turbulent mixing zone to provide a treated effluent discharge stream, while excluding from the discharge stream, effluent which has not passed through the turbulent mixing zone. Also in accordance with the present invention, at least a minimum energy dissipation level is maintained in the turbulent mixing zone during the disinfection process, and at least a minimum amount of energy is expended per unit throughput of treated effluent.

As indicated, the disinfectant and the effluent to be treated are passed through a turbulent mixing zone in which disinfectant concentration gradients are rapidly reduced to provide a substantially homogenous product stream within a limited period of time. In this connection, and although it is possible to mix for longer periods (overmix), the energy dissipation level should be sufficient to provide for achieving this desired level of inhomogeneity within about 1.5 seconds. For the purposes of the present invention, the average residence time $\theta$ of the effluent and disinfectant in the turbulent mixing zone is defined as follows:

$$\theta = V/Q \qquad (1)$$

where V is the volume of the turbulent mixing zone and where Q is the volumetric flow rate of the treated discharge stream. Under ordinary conditions of operation the residence time $\theta$ should be about 1.5 seconds or less.

As also indicated, at least a minimum energy dissipation rate is maintained in the turbulent mixing zone during the process. In this connection, a minimum energy dissipation rate should be maintained so that the turbulent mixing zone will have a mixing rate $\rho^{-1}$ (sec$^{-1}$) (which may also be referred to as a "shear rate") of at least about 10 seconds$^{-1}$, although for some larger mixing systems having a throughput capacity of over about 200 gallons per minute the mixing rate should be at least about 5 seconds$^{-1}$. In accordance with fluid dynamic principles, the mixing rate $\rho^{-1}$ is directly related to the specific turbulent energy dissipation rate $\epsilon$ of the turbulent mixing zone and is inversely related to the square of the scalar macroscale $L_s$ of the turbulence structure of the turbulent mixing zone as follows:

$$\tau^{-1} \simeq K \, (\epsilon/L_s^2)^{1/3}$$

where $k$ is a constant which is 0.489 for the cgs system of measurement.

Inhomogeneity, I, may be defined as the root mean square of the disinfectant local concentration fluctuations, $a$, divided by the (mixed) average concentration, $\overline{A}$, and in accordance with hydrodynamic principles, the mixing rate and the mixing residence time may also be utilized to characterize the inhomogeneity of the product stream with respect to concentration gradients of disinfectant within the product stream existing in the initial mixing zone. In the present invention, it is believed that disinfectant concentration gradients are reduced to a nearly uniform concentration within a very short residence time to provide a uniformly toxic environment for organism inactivation prior to substantial loss of disinfectant activity or potency. In connection with disinfectants such as chlorine, product inhomogeneity is believed to be reduced sufficiently rapidly that the most potent forms or species of disinfecting chemical are available throughout the turbulent field, homogeneously dispersed to the extent that they have a high statistical availability for interaction with organisms within the turbulent field for a period of time prior to a shift in disinfectant chemical form or species due to a pH shift, reaction with water, or reaction with other chemicals or nonbiological impurities.

From a practical point of view, it has been determined that greatly improved disinfection occurs with mixing rates of about 10 sec.$^{-1}$ or greater with corresponding mixing residence times of 1.5 seconds, or less. Although measurements have not been made, it is assumed for these conditions that product inhomogeneity is reduced to 0.1 or less.

As indicated, it is also useful to define a mixing number $\theta\rho^{-1}$, which is the product of the mixing residence time and the mixing rate, and which characterizes the product stream inhomogeneity. Mixing numbers from about 1.5 to 15 or greater should be applied to achieve superior disinfection results.

In addition, for a flow through system with continuous mixing, the specific energy requirement e (the energy dissipated per unit throughput of product stream or the work done in mixing the product stream) should best be at least about 0.2 horsepower per million gallons of treated effluent per day (MGD). For a given level of mixing, the specific energy requirement will increase with increasing mixing scale $L_s$, but will generally be in the range of from about 0.2 hp/MGD to 3 hp/MGD.

Mixing power dissipated in a liquid is ultimately dissipated viscously to heat. It can be dissipated through mean velocity gradients (similar to the power dissipation taking place in laminar flow), and in the turbulent region through velocity fluctuation gradients. It is, therefore, useful to differentiate between the total amount of power dissipated per unit mass of liquid and that portion dissipated per unit mass of liquid via the route of turbulent velocity fluctuations. For the purposes of this invention, the former is defined as the specific total energy dissipation rate $\epsilon_T$ while the latter is defined as a specific turbulent energy dissipation rate $\underline{\epsilon}$. The specific total energy dissipation rate $\epsilon_T$ is defined as:

$$P/pV$$

where P is the net power lost to fluid, $p$ is the fluid density and V is fluid volume.

The specific turbulent energy dissipation rate is defined as:

$$\underline{\epsilon} = \eta \epsilon_T$$

where $\eta$ is the intensity of turbulence.

In accordance with preferred embodiments of the method, an ejector-type mixing system is employed in which the turbulent mixing zone is produced by introducing a motive stream of a minor portion of the waste liquid to be treated into an induction zone which is supplied with the major portion of the waste liquid to be treated. The motive stream is generated by forcing the waste liquid through a suitable nozzle or other appropriate orifice. The introduction of the motive stream into the induction zone results in the entrainment of waste liquid from the zone into the stream and the formation of a turbulent flow field therein. The turbulent mixing zone thus produced has increasing volume and increasing cross-sectional area along its direction of movement within the induction zone. The disinfectant is best introduced into the turbulent mixing zone with the motive stream as it is introduced into the induction zone. Subsequently at least a portion of the waste liquid is conducted from the turbulent mixing zone to provide a discharge stream while excluding from the discharge stream waste liquid which was not part of the original jetstream or which was not inducted into the turbulent mixing zone such that substantially all of the waste liquid of the discharge stream originates from the turbulent mixing zone.

Figure 2:
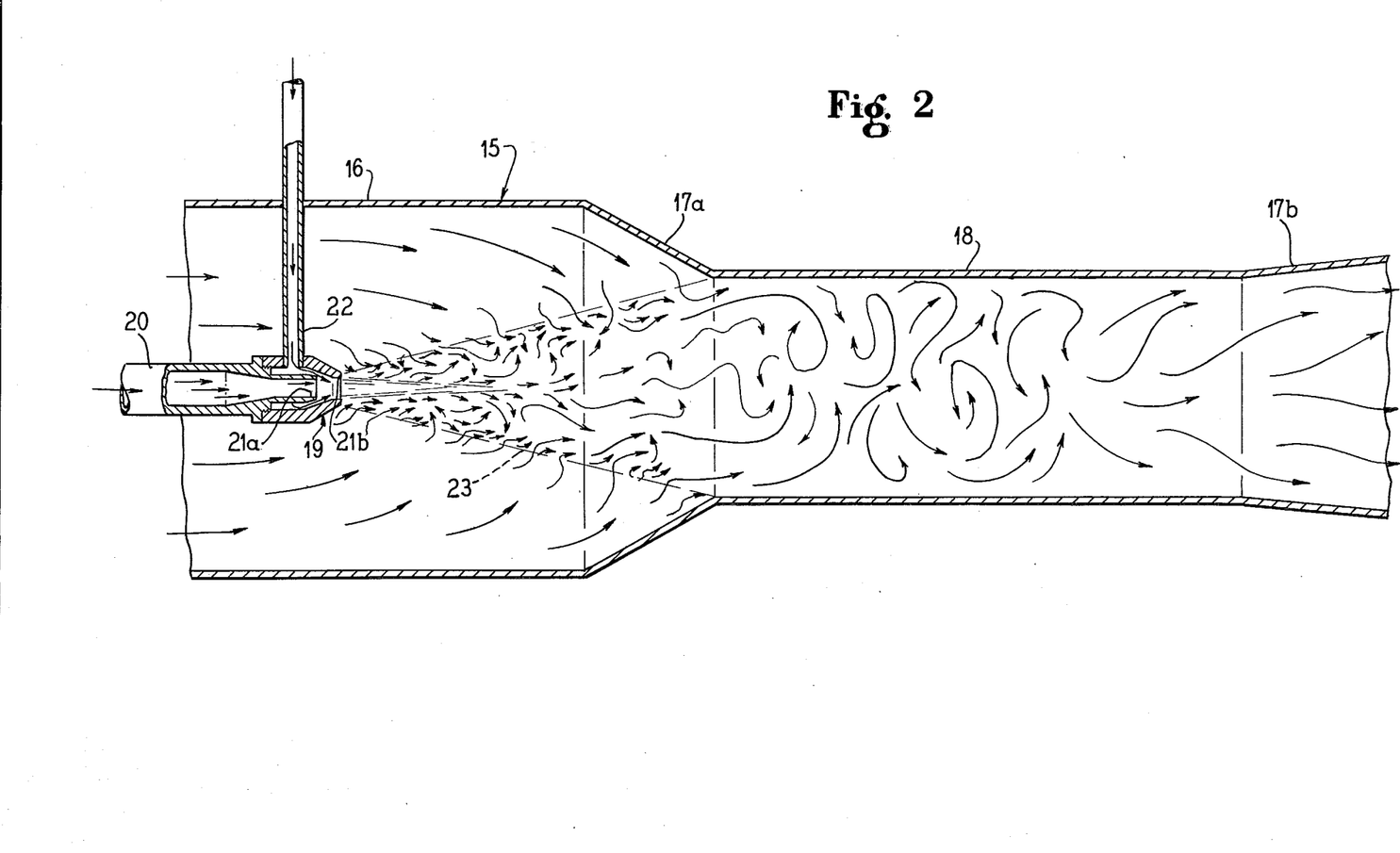
FIG. 2 is a cross-sectional view of an embodiment of a disinfection system constructed in accordance with the present invention.

FIG. 2 illustrates apparatus for carrying out various preferred embodiments of the present invention, and further description of the preferred methods will be made with reference to the illustrated apparatus. As shown in FIG. 2, there is provided a flow conduit 15 which comprises a cylindrical inlet portion 16 having a diameter $D_i$, converging neck portion 17a, a cylindrical mixing parallel 18 having a diameter $D_p$, and a diverging terminal portion 17b. A dual-nozzle assembly 19 is located within and along the longitudinal axis of the inlet portion 16 of the conduit 15. The nozzle assembly 19 includes a liquid nozzle assembly 21a having an internal diameter $d$ and a concentrically surrounding nozzle 21b located at the discharge end of the nozzle 21a and which has an internal discharge orifice diameter slightly larger than $d$. An inlet pipe 20 supplies the liquid nozzle 21a and both the nozzle 21a and disinfectant gas conduit 22 supply the nozzle 21b. In mixing systems which have been operated successfully the orifice diameter $d$ of the nozzle 21b has been related to the diameter $D_p$ of the mixing parallel 18 such that the ratio of $D_p$ to $d$ is in the range of from about 2.5:1 to about 13:1 (with a corresponding area ratio range of from about 6.25:1 to about 169:1). It is preferred that the area ratio range be from about 25:1 to about 169:1 (with a corresponding diameter ratio of 5:1 to 13:1) which is higher than that generally employed in ejector-type mixing systems. For reasons which will become apparent in description of the formation and sealing of the turbulent mixing zone against the walls of the mixing parallel 18 or converging neck 17a, the discharge end of the nozzle 21b is spaced longitudinally from the proximate end of the mixing parallel 18 a distance which is also related to the diameters of the nozzle 21b and the mixing parallel 18. In this connection the nozzle 21b should best be axially spaced a distance of from about 1 to about 2 times $D_p$ from the proximate end of the mixing parallel 18, and preferably a distance of about $1.5D_p$. Similarly, the length of the mixing parallel should best be from about 2 to about 5 times its diameter, and preferably about 3 times its diameter.

In operation, a minor portion of the effluent to be treated is pumped through supply pipe 20 and forced through nozzle 21a to form a jetstream of the waste liquid which also passes into and through the nozzle 21b. In passing through the nozzle assembly 21b, disinfectant such as chlorine gas is induced into the jetstream from the nozzle chamber and the amount of disinfectant so induced may be controlled separately from the amount of waste liquid passing through the nozzle chamber. Typically, for vacuum actuated gas chlorination, the disinfectant gas may be educted into the waste liquid jetstream at a vacuum of about 5 to 7 inches of mercury, although eduction at lower vacuum may be employed, and pressurized systems may also be used. The waste liquid jetstream and inducted disinfectant form a motive stream issuing from the nozzle 21b which is introduced into the induction chamber. Motive stream velocities in the range of from about 17 to about 82 feet per second have been determined to be effective, and generally the motive stream should have a velocity of at least about 17 feet per second. The nozzle 21b accordingly discharges both chlorine gas and motive fluid in the form of a relatively high velocity jet into the surrounding effluent within the turbulent mixing chamber, thus producing a turbulent field and substantially instantaneously mixing the disinfectant gas with effluent as the gas passes into solution.

The relatively high velocity jet mixture of effluent and disinfectant which is introduced into the turbulent induction chamber produces a conically shaped, highly turbulent field indicated by the dashed lines at reference numeral 23 which provides thorough mixing (i.e., rapid reduction of disinfectant concentration gradients) of the jetstream motive fluid, the disinfectant and the effluent inducted into the jetstream. At its expanded end, the turbulent mixing zone intercepts the wall of the conduit 15 to provide a continuous turbulent fluid seal which functions to prevent effluent which has not passed through the turbulent mixing zone from entering the discharge stream which is conducted through the cylindrical mixing parallel 18.

As the apparatus of FIG. 2 is radially symmetrical about its longitudinal axis (with the exception of the disinfectant inlet pipe 22), the turbulent mixing zone, which will hereinafter be referred to as the "mixing cone", is also symmetrically shaped from its apex at the discharge end of the nozzle 21 to its base at its circularly shaped intersection with the wall of the conduit 15. The included angle $\alpha$ defined by the (extrapolated) apex of the mixing cone will vary depending upon considerations relating to the relative velocity of the effluent in the mixing chamber but for a quiescent effluent, the included angle $\alpha$ will generally be about 14°.

As indicated, a minor portion $Q_1$ of the amount of waste liquid to be treated is forced through the nozzle 21b to form a motive stream and the major portion $Q_2$ of the waste liquid to be treated is supplied to the induction zone where it is entrained into the turbulent mixing cone. Flow ratios M of inducted effluent volumetric flow rate $Q_2$ to motive sewage effluent volumetric flow rate $Q_1$ of from about 1.4:1 to about 23.1:1 have been successfully employed. Preferably the ratio of $Q_2$ to $Q_1$ will be from about 5:1 to about 15:1.

The average residence time $\theta$ for apparatus of the type illustrated in FIG. 2 may be readily determined from the volume of the turbulent mixing cone. The effluent and disinfectant may generally be assumed to be mixed to within acceptable disinfectant concentration gradient limits upon reaching a point adjacent the base of the mixing cone at its intersection with the conduit 15. The volume V of the mixing cone thus defined may be calculated as follows:

$$V = \frac{\pi D^3 (1 - R^{3/2})}{24 \tan (\alpha/2)} \qquad (3)$$

Where D is the diameter of the intercepting conduit at the point of intersection with the mixing cone, R is the ratio of the area of the original jetstream orifice to the cross sectional area of the intercepting conduit at the point of intersection, and $\alpha$ is the included angle of the mixing cone.

The residence time of the apparatus of FIG. 2 may be calculated as follows from equations (1) and (3) for conditions in which all the fluid which passes through the mixing cone is conducted directly to the discharge stream $$\theta = \frac{V}{Q_1 (1 + M)} \qquad (4)$$

where M is the ratio of $Q_2$ to $Q_1$.
Substituting for $Q_1$ and combining equations (4) and (3), the residence time $\theta$ may be restated as follows:

$$\theta = \frac{1 - R^{3/2}}{6 \tan (\alpha/2) (1 + M) R} (D/u_1) \qquad (5)$$

It will also be seen from these relationships that a desired volumetric flow ratio M of the entrained effluent $Q_2$ to the motive effluent $Q_1$ may be obtained by variation of a number of factors in both the physical design and operation of the apparatus. It should also be noted that the volume of the turbulent mixing cone employed in the preferred embodiments the present method is limited to not more than about 1.5 times the volume of flow per second of the discharge stream conducted from the turbulent mixing cone. For ejector type mixing systems, the method and apparatus of the present invention may be characterized in terms of the stated ranges of area ratio R, motive stream velocity $u$, and flowrates M, which may provide $\rho^{-1}$ or $e$ values outside the ranges given earlier.

However, in accordance with the present method, the energy dissipation rate should generally be sufficient to provide a mixing rate $\rho^{-1}$ of at least about 5. In this connection, the specific turbulent energy dissipation rate $\epsilon$ is generally related to the power input P to the motive stream as follows:

$$\epsilon = \frac{f \eta P}{pV}$$

where $\rho$ is the intensity of turbulence, where P is the net power input from the motive stream, and $p$ is the fluid density which for aqueous sewage effluent is very nearly that of water. The factor $f$ represents the fraction of the primary power dissipated in the mixing zone. Since skin resistance promoting velocity gradients is minimal in this system, $\epsilon$ is very closely equal to $\epsilon_T$ and $\rho$ is very closely equal to 1. This is unlike a pure pipeline mixer where $\epsilon$ may be only 10 to 15% of $\epsilon_T$. The specific turbulent energy dissipation rate $\epsilon$ for apparatus of the type illustrated in FIG. 2 may also be expressed in terms of the mixing cone included angle $\alpha$, the cross sectional area ratio R, the motive stream velocity $u_1$ and the diameter D of the base of the mixing cone at its point of interception and seal with the wall of the conduit 15:

$$\epsilon = 3 \tan (\alpha/2) \left[ \frac{fR}{1-R} \; 3/2 \right] (u_1/D)$$

The scalar macroscale $L_s$ for a system such as illustrated in FIG. 2 may be approximated as about 0.131 D for purposes of calculation for equipment design, and by combining relationships (2) and (7) it will be seen that the mixing rate $\rho^{-1}$ for such a system may be expressed as:

$$\tau^{-1} = 1.36 \left[ \frac{fR}{1-R} \; 3/2 \right] (u_1/D)$$

Disinfection of sewage effluent with gaseous chlorine disinfectant in accordance with the present invention is capable of consistently and reliably providing bacterial kill rates of well over 99.9% as measured by fecal coliform removal and virus kill rates of well over 99% as measured by $f_2$ virus removal, within a matter of seconds (e.g., 3 seconds). Such results with chlorine gas may be due at least in part to the rapidity with which dissolved $Cl_2$ mixes with the totality of the sewage effluent with respect to the rate at which aqueous chlorine enters into undesirable side reactions with effluent components such as various nitrogen based materials.

It is also recognized that gaseous chlorine can be expected to go into solution very rapidly and that the pH value of sewage effluent is generally such that essentially no dissolved $Cl_2$ (as opposed to hypochlorite ions) will be present at equilibrium under ordinary conditions. In this connection it may also be that the introduction of gaseous chlorine into the turbulent zone of the effluent in the form of fine, highly dispersed bubbles results in the transfer into solution and mixing of dissolved $Cl_2$ sufficiently rapidly as to provide for exposure of the effluent within the turbulent zone to chlorine in the $Cl_2$ form.

Regardless of whether the foregoing explanations are correct, the fact remains that treatment of the sewage effluent with chlorine under the conditions of hydrodynamic mixing which exist in the present invention provides significantly improved disinfection performance and reduces the time required for achieving any given reduction of bacteria and virus. Nevertheless, it is believed to be important to exclude waste liquid which has not passed through the initial turbulent mixing zone from the system discharge stream. Accordingly, only waste liquid which is thoroughly mixed with disinfectant within a limited time period of the introduction of the disinfectant is discharged from the system outlet, thereby minimizing the deleterious effects of adverse side reactions and maximizing the efficiency of the system. In connection with the embodiments described in connection with the appratus of FIG. 2, the turbulently expanding mixing cone intersects the boundaries of the conduit 15 to form a continuous turbulent seal which prevents waste liquid which is not part of the mixing cone from passing beyond the turbulent seal. In this regard, the turbulent effects of the intersection of the mixing cone are sufficient to disrupt any substantial laminar flow region adjacent the wall of the conduit 15 in its turbulent seal region. For the development and maintenance of such a turbulent seal, the geometry of the system and the power input to the motive stream should be such that sufficient turbulent energy remains in the turbulent mixing cone by the time it reaches its point of intersection with the conduit wall of the discharge stream that such a seal can be effected. In operation, it is a desirable feature of the method that a constant volumetric flow of motive flow may be maintained through the nozzle 21a (e.g. through the use of a constant volume pump) while the rate of waste liquid inducted into the mixing cone and the volumetric discharge flow rate may vary over a substantial range according to variations in the supply of waste liquid for disinfection to the induction chamber. The geometry of the system including the placement of the nozzle 21b may be such that the intersection of the mixing cone with the conduit 15 will be located at about the proximate end of the mixing parallel 18 for intermediate rates of effluent treatment flow. With the same motive flow rate and smaller total treatment rates, the intersection seal of the mixing cone may occur along the surface of the converging neck portion 17a of the conduit 15, and for larger total treatment rates, the extended mixing parallel 18 provides for maintenance of a seal upon intersection of the mixing cone at locations downstream of the converging neck of the conduit. If the nozzle is improperly placed with respect to the surface boundary intended to be intersected by the mixing cone, or if the power input to the effluent motive stream is insufficient to provide a sufficiently energetic intersection, a suitable seal will not be provided and effluent with high biological values may enter the mixing parallel and the discharge stream of the system. Further in this latter connection, in accordance with fluid dynamics principles from a mixing point of view it is desirable to operate the system such that the intensity of turbulence $p$ and the fraction of primary power dissipated F approach 1 so that the total power input approaches being or is turbulently dissipated. In order to accomplish this, the system may be operated with little or no pressure recovery to the discharge stream from the motive stream (i.e., the discharge pressure should best be approximately equal to the body pressure of the mixing system), as this pressure recovery is a measure of (1-F)P.

In establishing and maintaining an effective seal it is desirable that the boundary which is intersected by the mixing cone have a configuration which will minimize the formation of a laminar boundary layer of potentially undisinfected effluent adjacent the surface. It has been found that even with very smooth boundaries such as found with fiberglass reinforced polyester pipe provide excellent results when operated in accordance with the above conditions. However, the formation of an effective seal and laminar flow disruption may be enhanced by surface projections or depressions at the intersected surface boundary such as a series of projecting rings which disrupt flow adjacent the surface. It will be recognized, of course, that as a turbulent field approaches any fixed boundary, departure from isotropy occurs and intensity of turbulence decreases. However, it is believed that for an effective seal the intensity of turbulence should be about 0.1 or more at a distance of 0.1 D from the fixed boundary.

Figures 1, 3:
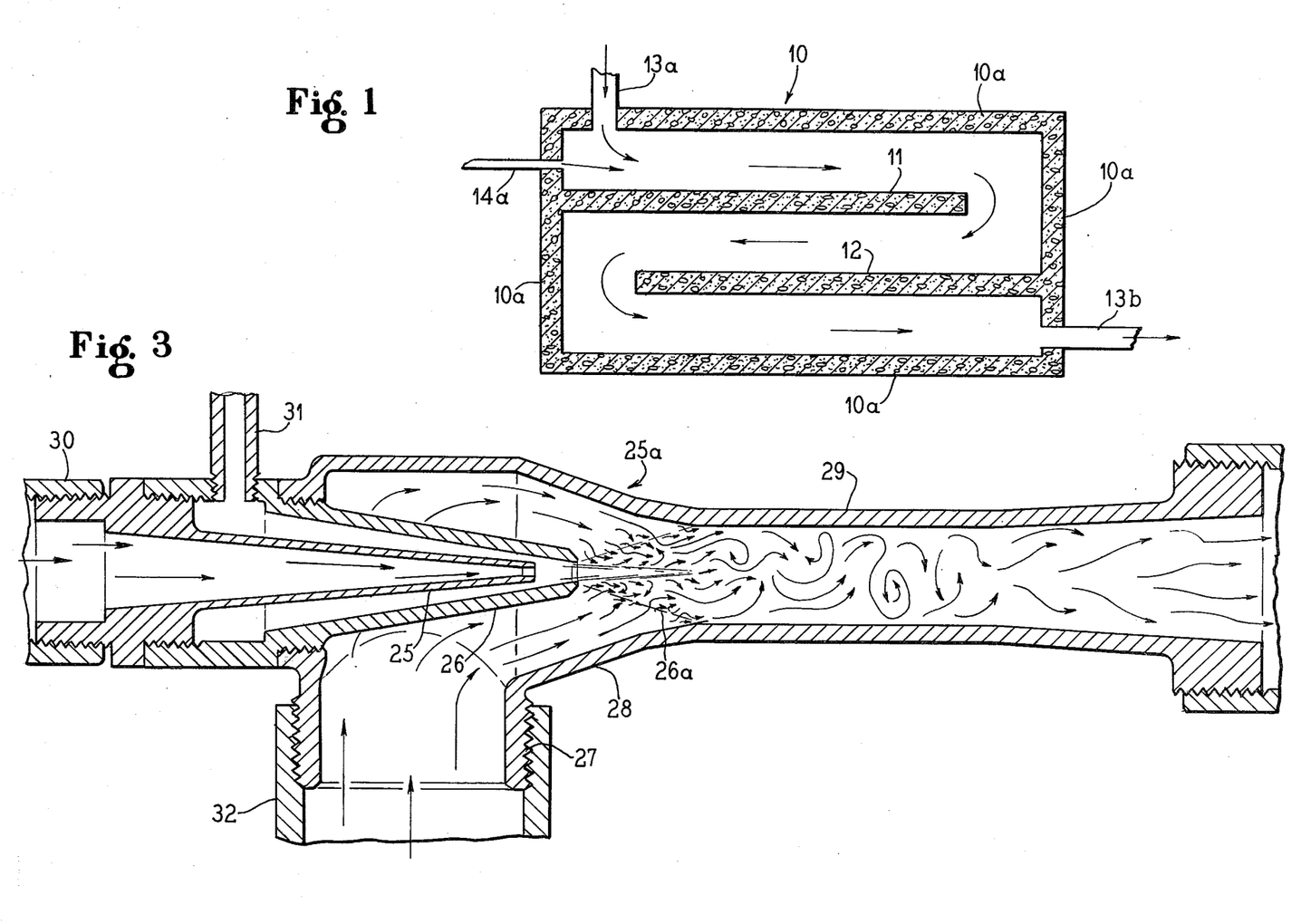
FIG. 1 is a partially schematic plan view of a prior art disinfection system.
FIG. 3 is a cross-sectional view of an embodiment of a dual nozzle hydrodynamic mixer for treating effluent with aqueous chlorine solution.

In FIG. 3, there is illustrated a mixing device 25a which is particularly adapted for treating sewage liquids or effluent with aqueous chlorine solutions. The device there illustrated includes an inner nozzle 25 which is coaxial with an outer nozzle 26. The latter is received in threaded engagement within a housing 27 in which there is formed a tapered neck portion 28 and a tubular mixing parallel 29. The primary sewage motive fluid is introduced into the inner nozzle 25 through an inlet 30 while an aqueous chlorine solution is supplied to the inner nozzle 25 by means of a conduit 31. Secondary sewage liquid is supplied to an induction zone by means of an inlet 32 whose axis is at right angles to the axis of the nozzles 25 and 26.

As the primary sewage motive fluid is forced through the inner nozzle 25 under substantial pressure, it comes in contact at substantial velocity with the aqueous chlorine solution supplied to nozzle 26, and educts chlorine solution before emerging from the outer nozzle 26. The rate of flow of the aqueous chlorine solution may be controlled independently of the flow rate of the motive effluent fluid, and will be relatively small in comparison to the motive effluent flow rate and the total effluent treatment rate. For example, aqueous chlorine sewage disinfectant treatment solution conventionally may have concentrations of from about 300 mg/l to about 3000 mg/l, and at a typical treatment dosage of about 2 mg/l, the flow rate of aqueous chlorine disinfectant will be from about 0.7 gallons per minute (GPM) to about 7 GPM for a system having a motive effluent flow rate of 120 GPM and a total effluent treatment rate of 1000 GPM. The primary effluent liquid and aqueous chlorine motive stream issues from the nozzle 26 into the turbulent induction zone where additional waste liquid is inducted into the jetstream to form a highly turbulent conically-shaped continuously expanding mixing cone 26a which intersects the near end of the mixing parallel 29. Effluent which has not been subjected to passage through the mixing cone is excluded from the product stream which flows through the mixing parallel 29 and is discharged from its far end. While the use of an aqueous chlorine solution is less effective than the use of gaseous chlorine under the same conditions of operation, nevertheless the mixing system shown in FIG. 3 provides substantial advantages in comparison with conventional disinfection systems which employ an aqueous chlorine solution as a treating agent. When using an aqueous chlorine disinfectant it is preferred that the disinfectant have a pH of less than about 5 and more preferably about 3 or less. Although the acidity of the disinfectant solution has little effect on the pH of the treated effluent, it will shift the disinfectant species equilibrium to increase the concentration of more lethal $Cl_2$ and $HOCl$. Upon rapid mixing, it is theorized that some of the benefits of this enhanced lethal species concentration will be obtained before equilibrium conditions are reached for the higher pH of the mixed product stream.

A substantial amount of experimental data was obtained in tests conducted on secondary effluent from a biological treatment plant utilizing a test mixer which was alternately fed gaseous chlorine (G) and aqueous chlorine (A). The successful variable range of study for this work was as follows:

| | |
|---|---|
| Flow Ratio M | 1.4: 1 to 23.1:1 |
| Diameter Ratio D/d | 2.5:1 to 13:1 |
| Motive stream velocity | $u_1$ 17 to 82 feet per second |
| Mixing rate | $\tau^{-1}$ 98.6 to 303 seconds.$^{-1}$ |
| Residence time | .014 to .346 seconds. |
| Mixing number $\theta\tau^{-1}$ | 1.51 to 10.85 |
| Specific energy requirement e | .011 to 5.90 hp/MGD |
| Total throughput | up to 40 GPM |

Figure 4:
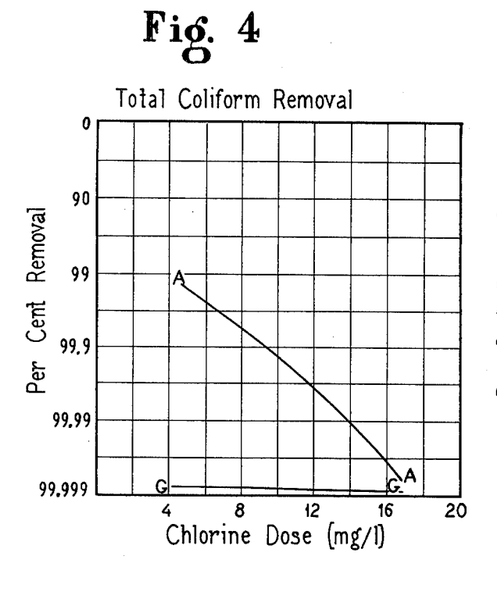
FIG. 4 is a graph showing the results of coliform bacteria removal from sewage effluent as a function of disinfectant dose.
Figure 5:
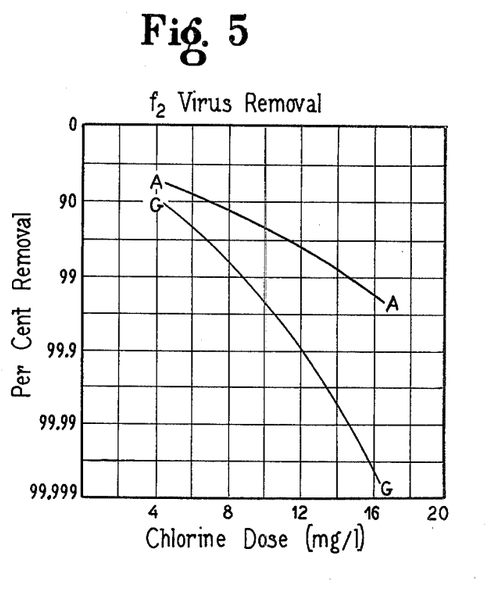
FIG. 5 is a graph plotting the percent removal of $f_2$ virus from sewage effluent as a function of disinfectant dose.

There was a very significant difference noted in the disinfection rate, the total kill, and the amount of chlorine required. FIGS. 4 and 5 show the percentage removal of total coliform bacteria and $f_2$ virus as a function of the dose of disinfectant. FIG. 4 shows that essentially complete removal of coliform bacteria was effected by a dosage of only 4 milligrams per liter of gaseous chlorine, whereas a dosage in excess of 16 milligrams per liter was required to effect the same kill with the aqueous solution. The reduction in the total amount of chlorine required when using gaseous chlorine in accordance with the present invention to achieve a substantially complete removal of coliform bacteria from sewage represents a significant savings in material. This is accompanied by the production of a discharge liquid which has a lower chlorine content (residual chlorine) than commonly achieved and, therefore, is less toxic to marine life.

The removal of $f_2$ virus as shown in FIG. 5 is even more significant. It is a well known fact that chlorine disinfectant systems used in the past have been rather ineffective in killing virus. Only a slight reduction in virus is usually obtained across a chlorine contact chamber. The removals obtained with both aqueous and gaseous chlorine shown in FIG. 5 are superior to those obtained in commercially available chlorine disinfection systems. The improved mixing conditions of the present invention make virus removal with chlorine equal to or better than conventional methods of treatment with ozone, an agent known for its virucidal power. Of course, the virucidal properties of ozone may in turn be utilized through the method of the present invention by employing ozone as a disinfectant fluid.

Figure 6:
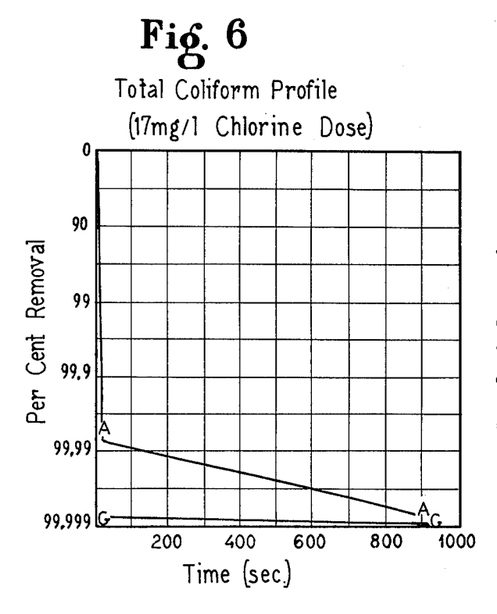
FIG. 6 is a graph plotting the percent removal of coliform bacteria as a function of time.
Figure 7:
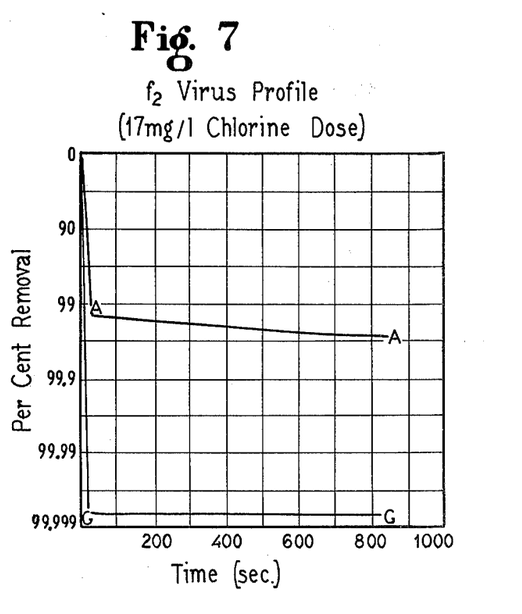
FIG. 7 is a graph plotting the percent removal of $f_2$ virus as a function of time.

FIGS. 6 and 7 show the removal of coliform bacteria and $f_2$ virus measured in accordance with the standard methods for the examination of water and waste water, as a function of time with dosage levels of 17 milligrams per liter in each case. As seen from these two graphs, the present invention provides an extremely high rate of kill, effecting a 99% or better removal of $f_2$ virus in a matter of a few seconds or less. (The kill was effected as rapidly as testing could be made).

In addition to the disinfection performance of the present invention in terms of improved bacteria and virus kill which, of course, are important from a health and ecological point of view, the invention also provides a number of additional advantages. First of all, the present invention may be employed to eliminate the requirement for the contact chamber which is generally used in conventional chlorination systems such as illustrated in FIG. 1. The chamber 10 which may comprise a large, concrete, uncovered structure, includes a pair of parallel baffles 11 and 12 which in conjunction with the vertical side walls of the chamber define a tortuous path of flow for the sewage effluent being treated. The effluent is introduced into the contact chamber 10 by means of an effluent inlet 13a and an aqueous chlorine solution is introduced into the contact chamber through a second, proximately spaced inlet 14. The mixture of aqueous chlorine and sewage moves within the contact chamber about the baffles 11 and 12 and is ultimately discharged through an effluent outlet 13b. The residence time of the effluent in such systems will typically range from 15 to 30 minutes. Contact chambers involve not only a capital expense but also involve the utilization of a considerable amount of land area which, depending upon the size of chlorination system, the location thereof and the use to which the land involved may be more profitably employed, may be an extremely significant factor. Furthermore, the present invention actually reduces the overall costs involved in disinfecting a given quantity of effluent. Inherent in a conventional contact chamber disinfection system is the initial cost involved in constructing the chamber and the power required to produce and pump the aqueous chlorine solution to the contact chamber.

Figures 11, 12:
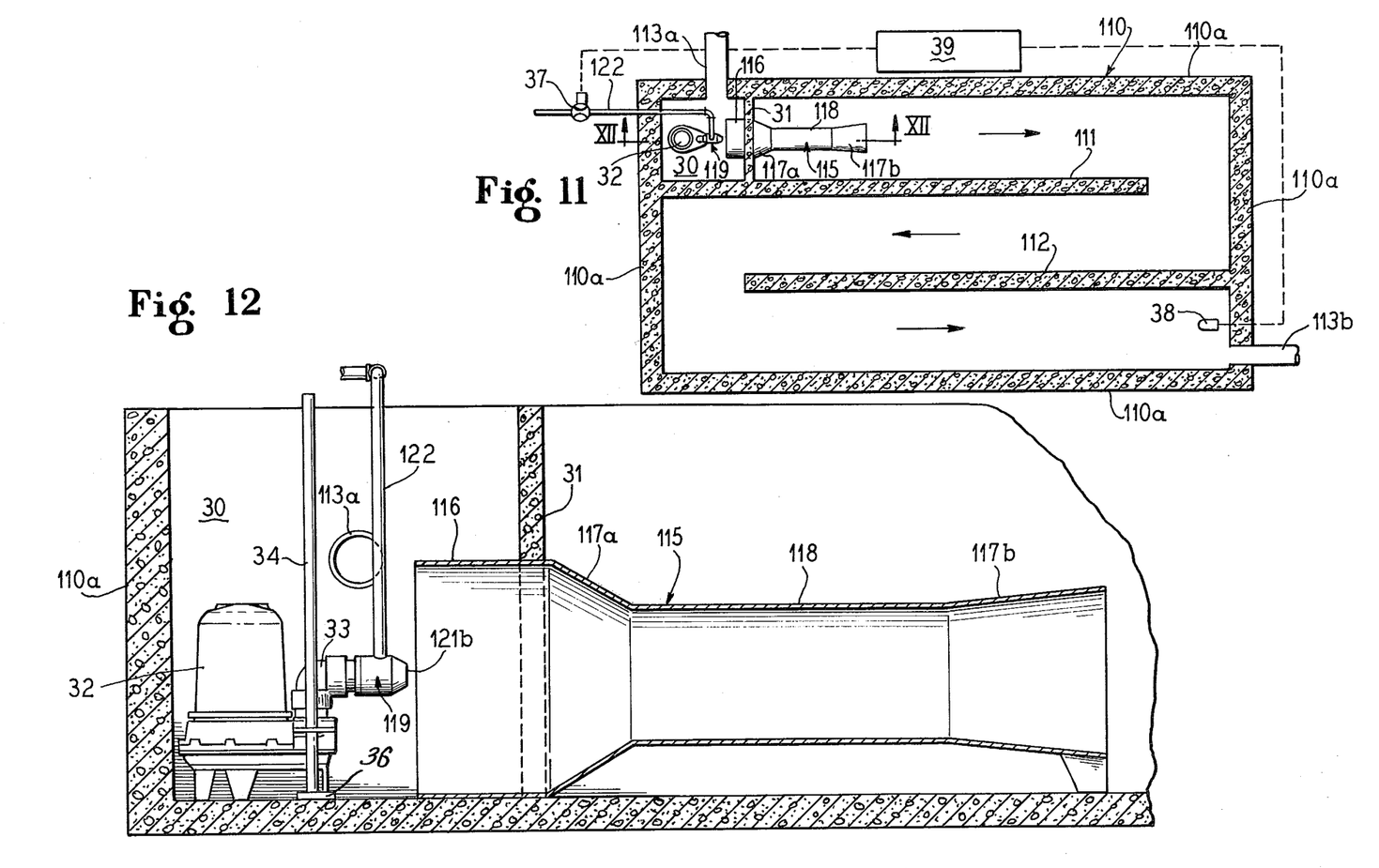
FIG. 11 is a partially schematic plan view of the disinfection plant from which the data shown in FIGS. 8, 9 and 10 was derived.
FIG. 12 is an enlarged sectional view of the sump portion of the plant shown in FIG. 11.

FIG. 11 discloses a contact chamber disinfection plant which is similar to the plant shown in FIG. 1. The FIG. 11 embodiment is schematically illustrative of the contact chamber employed in the municipally-owned activated sludge waste treatment located at Prophetstown, Ill. One difference between the contact chamber shown in FIG. 11 and that located at Prophetstown resides in the number of channels involved. The Prophetstown contact chamber includes only a single channel, whereas the contact chamber shown in FIG. 11 includes 3 channels. Functionally, however, the two channels are identical, and the contact chamber of FIG. 11 has been illustrated with 3 channels merely to make it correspond to the prior art contact chamber shown in FIG. 1.

Originally the Prophetstown contact chamber included an effluent inlet as shown at reference numeral 13a in FIG. 1, an effluent outlet as shown at 13b and an inlet pipe as shown at 14a. Recently, however, the contact chamber was modified to conform to that shown in FIG. 11, which utilizes the principles of the present invention.

As shown in FIGS. 11 and 12 the contact chamber indicated generally at reference numeral 110 comprises an effluent inlet 113a and an effluent outlet 113b. A sump 30 has been formed at the inlet end of the contact chamber 110 and a partition wall 31 has been added to define the sump 30 in part.

Located within the sump 30 is a conduit 115 similar to the conduit 15 shown in FIG. 1. A nozzle assembly 119 is disposed in axial alignment with the conduit 115, the inner nozzle of which is supplied with pressurized effluent by means of a submersible pump 32 via a conduit 33, and the outer nozzle of which is supplied with gaseous chlorine by means of a supply pipe 122. A vertical rod 34 extends through a flange 36 formed on the pump 32 to guide in the placement and retrieval of the pump and nozzle assembly.

An adjustable control valve 37 is mounted in the gaseous chlorine supply pipe 122 for controlling the flow of chlorine gas to the nozzle assembly 119. Located downstream of the conduit 115 (and preferably near the effluent outlet 113b) is a sensor or probe 38, the function of which is to produce a signal which varies in accordance with variations in the level of residual chlorine in the effluent being discharged from the contact chamber 110.

The sensor 38 and the control valve 37 are electrically interconnected through an analyzer 39 such that the analyzer 39 may be adjusted to control the flow of chlorine gas to the nozzle assembly 119 to produce a selected level of residual chlorine in the effluent as it is discharged from the contact chamber 110.

In addition, the control system may be utilized to meter an appropriate flow of dechlorination agent such as $SO_2$ into the disinfected effluent to eliminate any remaining residual chlorine.

Tests were conducted in the Prophetstown contact chamber as it existed prior to its modification (essentially as shown in FIG. 1) and using chlorine gas as the disinfection agent in the manner in which it had been previously operated. In this regard, the chlorine gas was simply diffused directly into the effluent at the input end of the contact chamber.

Figure 8:
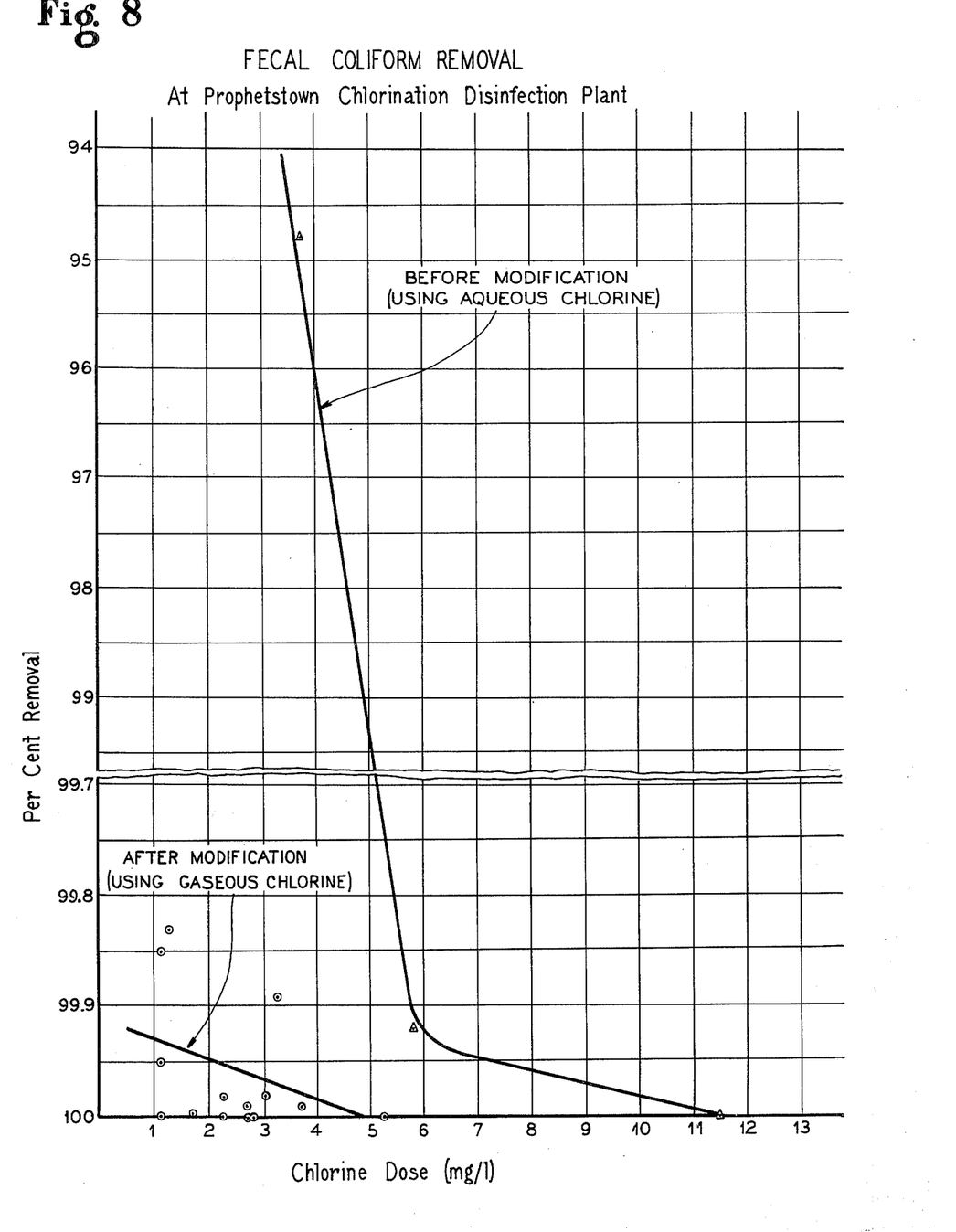
FIGS. 8, 9 and 10 are graphs presenting disinfection data from operation of an existing chlorination disinfection plant modified in accordance with the principles of the present invention.
Figure 9:
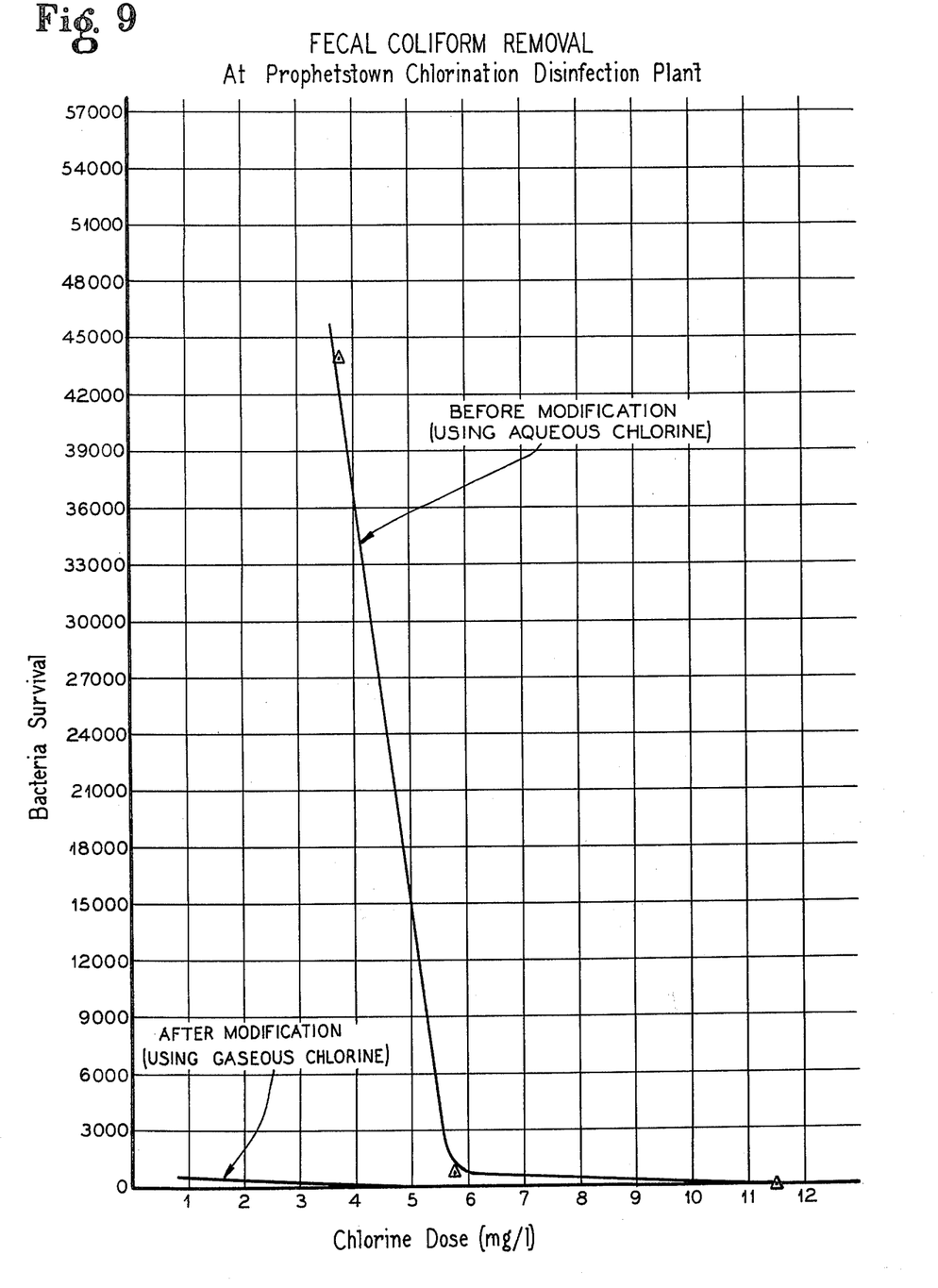
Figure 10:
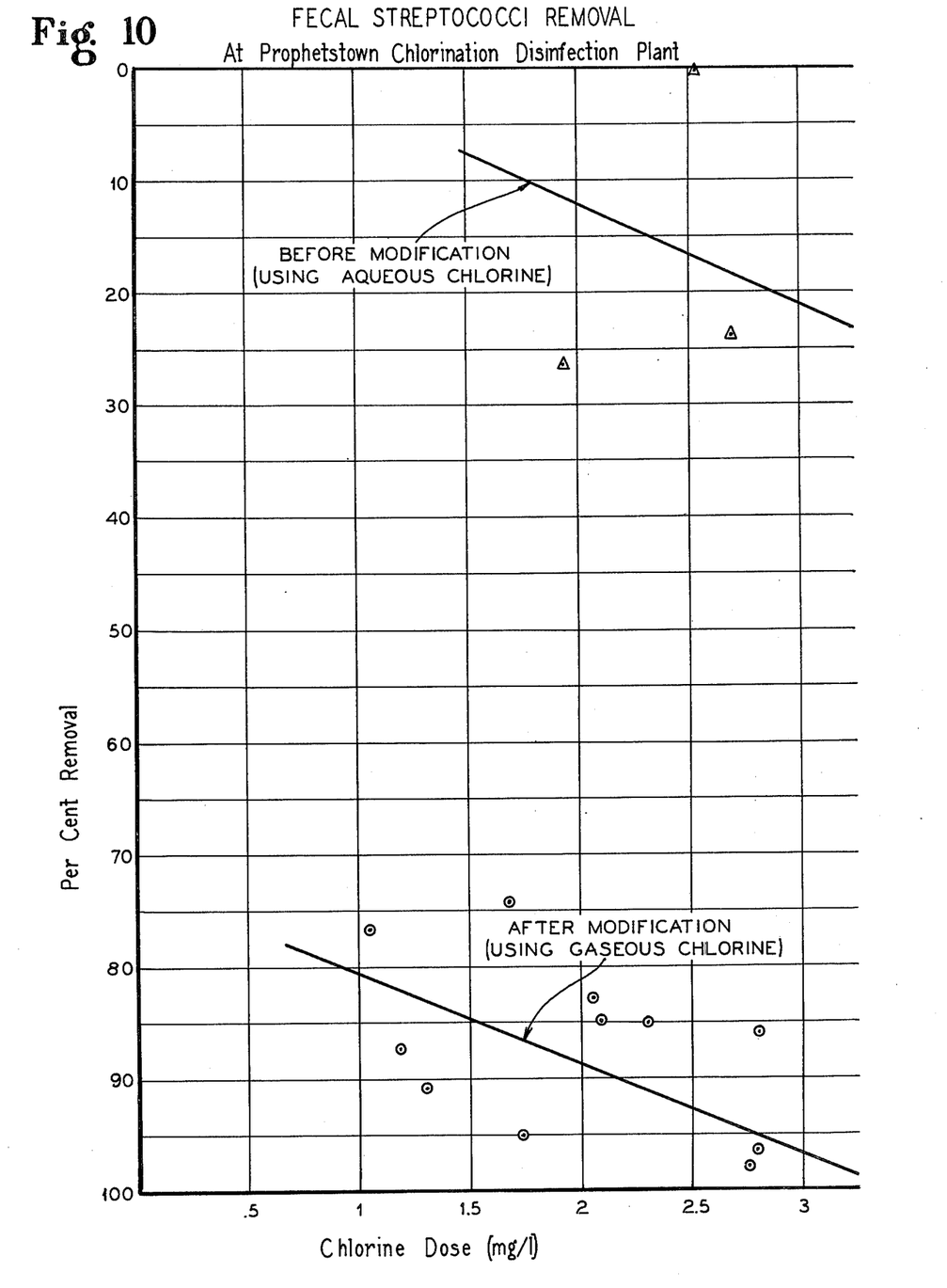

Tests were also conducted after the contact chamber had been modified in accordance with the principles of the present invention. The results of these tests are shown in FIGS. 8, 9 and 10.

The latter figures, which compare the effectiveness of the Prophetstown chlorination disinfection contact chamber both before and after modification, disclose the significant improvement in effectiveness which resulted from the employment of the present invention. Not only was the fecal coliform greatly reduced both in terms of percent removal and actual bacteria removal, but this disinfection was accomplished at reduced chlorine dosages. Removal of fecal streptococci was also markedly reduced as a consequence of the present invention.

The following Table I includes additional data relating to the up-grading of the Prophetstown disinfection plant through the use of the present invention.

TABLE I

| Date of Test | FECAL COLIFORM | | | Dosage (mg/l) | Residual Chlorine (mg/l) |
|---|---|---|---|---|---|
| | Before No./100 ml | After No./100 ml | % Kill | | |
| 4-22-74 | 320,000 | 40 | 99.98 | 3.1 | .95 |
| 4-24-74 | 25,000 | 0 | 100.00 | 2.3 | .85 |
| 5-1-74 | 350,000 | 380 | 99.89 | 3.3 | 1.40 |

TABLE I-continued

| | FECAL COLIFORM | | | | |
|---|---|---|---|---|---|
| Date of Test | Before No./100 ml | After No./100 ml | % Kill | Dosage (mg/l) | Residual Chlorine (mg/l) |
| 6-4-74 | 330,000 | 15 | 99.99 | 3.75 | .60 |
| 6-19-74 | 290,000 | 0 | 100.00 | 2.83 | .52 |
| 7-16-74 | 150,000 | 250 | 99.83 | 1.31 | .60 |
| 7-30-74 | 1,260,000 | 45 | 99.99 | 2.77 | 2.75 |
| 7-31-74 | 660,000 | 0 | 100.00 | 2.80 | .40 |
| 8-6-74 | 650,000 | 320 | 99.95 | 1.18 | .18 |
| 8-13-74 | 820,000 | 160 | 99.98 | 2.30 | .27 |
| 8-15-74 | 110,000 | 0 | 100.00 | 1.18 | .80 |
| 8-20-74 | 200,000 | 4 | 99.998 | 1.73 | 1.30 |
| 8-22-74 | 120,000 | 180 | 99.85 | 1.18 | .21 |
| 9-4-74 | 280,000 | 0 | 100.00 | 5.28 | 3.50 |
| Average | 400,000 | 100 | 99.96 | 2.50 | 1.02 |

TABLE II

| | MONTHLY AVERAGES AT PROPHETSTOWN STP | | | | | | | | | |
|---|---|---|---|---|---|---|---|---|---|---|
| Month | RAW BOD, (Average) | RAW BOD, (Range) | FINAL BOD, (Average) | FINAL BOD, (Range) | RAW Sus. S. (Average) | RAW Sus. S. (Range) | FINAL Sus. S. (Average) | FINAL Sus. S. (Range) | NH$_3$-N | pH |
| JUNE | 180 | 190–170 | — | — | 210 | 220–160 | 12 | 14–10 | 7.03 | 7.3 |
| JULY | 117 | 160–80 | 25 | 40–14 | 136 | 182–136 | 8 | 26–8 | 9.97 | 7.25 |
| AUGUST | 163 | 220–188 | 20 | 26–16 | 206 | 304–152 | 25 | 55–12 | 14.66 | 7.54 |
| SEPTEMBER | 180 | 210–160 | 16 | 19–9 | 218 | 242–158 | 17 | 21–8 | 16.0 | 7.50 |

NH$_3$-N RANGE - 4.9 – 23.0 mg/l
pH RANGE - 7.1 – 7.65

In the above Table I, the column entitled "Before" indicates the actual number of fecal coliform per 100 milliliters of effluent as the effluent enters the modified disinfection system. The column entitled "After" indicates the actual number of fecal coliform bacteria in the effluent as it discharges from the modified disinfection system. Thus, Table I discloses not only a significant reduction in the actual number of fecal coliform per millimeter of effluent as it is discharged from the contact chamber, but also indicates a substantial increase in percent kill while using a reduced dosage and while realizing a substantial reduction in residual chlorine. With respect to the column entitled "Dosage" it will be appreciated by those skilled in the art that the dosage involved in conventional contact chambers utilizing aqueous chlorine is typically between 5–10 milligrams per liter and is often as high as 15–20 milligrams per liter. The range of variables successfully studied in the Prophetstown treatment facility was as follows:

| | |
|---|---|
| Flow ratio M | 2 to 6 |
| Diameter ratio D/d | 9.8 |
| Motive stream velocity $u_1$ | 32 feet per second |
| Mixing rate $\tau^{-1}$ | 10.9 seconds $^{-1}$ |
| Residence time $\theta$ | 1.19 to .71 seconds |
| Mixing number $\theta\tau^{-1}$ | 13 to 7.7 |
| Specific energy requirement e | .7 to 1.4 hp/MGD |
| Total throughput | 200 to 500 GPM |

It should be understood that my invention also contemplates the use of more than one plug flow conduit and nozzle assembly if the flow rate of effluent is of sufficient magnitude. Thus, referring to FIGS. 11 and 12, a plurality of plug flow conduits 115 and nozzle assemblies 119 may be disposed within the sump 30 to accommodate larger systems having greater effluent flow rates. The plurality of nozzles may each be provided with a separate conduit-mixing parallel arrangement, or more than one nozzle may be directed to a conduit-mixing parallel assembly such that the mixing cones intercept either a solid boundary, or each other, to provide a seal. Moreover, conduits and nozzles of non-circular cross section may be employed and, fluid may exit the turbulent mixing zone at more than one point.

In a larger plant treating several million gallons per day, four units, as shown in FIG. 11, were mounted in parallel on the partition wall in one half of a dual train contact basin. The four motive nozzle assemblies were fed by a single pump. The other half of the basin was left unmodified so that a simultaneous comparison could be made. Gaseous chlorine was fed directly to the nozzles of the modified system, as previously described. The conventional gas dissolving and metering system was left intact, so that the conventional system was fed an aqueous chlorine solution, as is normal practice.

The disinfection results are reported as follows:

TABLE III

| | FECAL COLIFORM | | | | | |
|---|---|---|---|---|---|---|
| | Conventional vs. Modified | | | | | |
| | Ten Minutes Channel Contact Time | | | | | |
| Date of Test | Before No./100 ml | After Conventional No./100 ml | % Kill | After Modified No./100 ml | % Kill | Dosage mg/l |
| 3-10-75 | 373,000 | 2,340 | 99.37 | 166 | 99.96 | 1.54 |
| 3-11-75 | 247,000 | 1,740 | 99.30 | 100 | 99.96 | 1.61 |
| 3-12-75 | 137,000 | 2,140 | 98.44 | 60 | 99.96 | 1.55 |
| 3-13-75 | 57,000 | 340 | 99.40 | 52 | 99.91 | 1.61 |
| 3-17-75 | 66,700 | 320 | 99.82 | 78 | 99.88 | 1.48 |

TABLE III-continued

FECAL COLIFORM
Conventional vs. Modified
Ten Minutes Channel Contact Time

| Date of Test | Before No./100 ml | After Conventional No./100 ml | After Conventional % Kill | After Modified No./100 ml | After Modified % Kill | Dosage mg/l |
|---|---|---|---|---|---|---|
| 3-18-75 | 86,700 | 620 | 99.28 | 91 | 99.90 | 1.34 |
| Average | 161,200 | 1,250 | 99.22 | 91 | 99.94 | 1.52 |

Various modifications might be suggested by those skilled in the art, and it should be understood that it is intended to embody within the scope of the patent warranted hereon all such modifications as reasonably come within the scope of the present contribution of the art.

Various features of the invention are set forth in the following claims.

What is claimed is:

1. A rapid and efficient method for disinfecting sewage effluent, comprising the steps of continuously mixing and passing sewage effluent having pretreatment biological values to be disinfected and an effective sewage treatment disinfectant dose level of a fluid disinfectant through a turbulent mixing zone while maintaining a turbulent energy dissipation level in the turbulent mixing zone such that the mixing rate in the mixing zone is at least about 5 seconds$^{-1}$ to provide a turbulently mixed product stream having a substantially uniform toxic environment for organism inactivation, said turbulent mixing zone being produced by introducing at least one motive stream of a minor portion of the sewage effluent to be treated into an induction zone which is supplied with the major portion of the sewage effluent to be treated, wherein the ratio of the volumetric rate of induction of sewage effluent from the induction zone into the turbulent mixing zone to the volumetric flow rate of the motive stream is in the range of about 1.4:1 to about 23:1 and wherein the velocity of the motive stream introduced into the induction zone is at least about 17 feet per second, conducting the turbulently mixed sewage effluent and disinfectant product stream from said mixing zone to provide a treated discharge stream such that the average residence time in said turbulent mixing zone of said product stream conducted from said mixing zone is about 1.5 seconds or less while maintaining a specific energy requirement of at least about 0.2 horsepower per million gallons per day of the discharge stream and excluding from said discharge stream sewage effluent which has not passed through said turbulent mixing zone to provide treated effluent with at least a 99.9 percent bacterial kill rate as measured by fecal coliform removal and a viral kill rate of at least 99 percent as measured by $f_2$ virus removal.

2. A method in accordance with claim 1 wherein said disinfectant is chlorine gas.

3. A method in accordance with claim 1 wherein said product stream is conducted from said turbulent mixing zone into a mixing conduit zone and wherein said exclusion of non-turbulent mixing zone sewage effluent is accomplished by forming a turbulent seal between the turbulent mixing zone and the mixing conduit zone boundary.

4. A method in accordance with claim 3 wherein the motive stream introduced into the induction zone and the turbulent seal of the turbulent mixing zone with the mixing conduit zone boundary are circular in cross section and wherein the ratio of the diameter of the turbulent mixing zone at its turbulent seal to the diameter of the motive stream introduced into the induction zone is in the range of about 2.5:1 to about 13:1.

5. A method in accordance with claim 1 wherein said disinfectant is gaseous or aqueous chlorine and wherein said disinfectant dosage is 17 mg. or less per liter of effluent.

6. A method in accordance with claim 5 wherein said disinfectant is an aqueous chlorine solution having a pH of less than 5.

7. A method in accordance with claim 5 wherein said disinfectant is an aqueous chlorine solution having a pH of less than 3.

8. Contact chamber apparatus of the ejector type for disinfecting sewage effluent comprising sewage treatment contact chamber means comprising a sewage effluent treatment channel, inlet means for introducing sewage effluent to be treated into the inlet end of said channel, and treated sewage effluent outlet means for discharging treated effluent from said channel, sump partition means for isolating a sump zone at the inlet end of said contact chamber means from a downstream treated effluent sewage contact chamber zone, said partition means further comprising conduit means including a mixing parallel defining a one-pass flow path through which a sewage effluent stream may be directed from said sump zone to said downstream contact chamber zone, means forming a liquid nozzle for receiving a minor portion of the sewage effluent to be treated to provide a motive liquid jet discharging from the nozzle outlet into said sump zone and directed toward said conduit means and submersible pump means located within said sump zone for pumping said minor portion of said sewage effluent from said sump zone through said nozzle, and means for introducing a fluid disinfectant into the motive jet wherein the ratio of the cross-sectional area of said mixing parallel to the cross-sectional area of said nozzle is from about 25:1 to about 169:1.

9. Disinfecting apparatus in accordance with claim 8 further including means for sensing the concentration of disinfectant downstream of the motive jet and for controlling the introduction of disinfectant into the motive jet in a predetermined manner as a function of the sensed concentration of disinfectant.

* * * * *